March 17, 1925.

N. CHMELL ET AL 1,530,071

VEHICLE BUMPER

Filed Oct. 24, 1924    2 Sheets-Sheet 1

INVENTORS
N. CHMELL
L. PELIS
J. DMYTRASH
By B. Pelechowie
ATTY.

March 17, 1925.

N. CHMELL ET AL 1,530,071

VEHICLE BUMPER

Filed Oct. 24, 1924

INVENTORS
N. CHMELL
L. PELIS
J. DMYTRASH

By B. Pelechowiez
ATTY.

Patented Mar. 17, 1925.

1,530,071

UNITED STATES PATENT OFFICE.

NICK CHMELL, OF CHICAGO, ILLINOIS, AND LOUIS PELIS AND JOHN DMYTRASH, OF LAPORTE, INDIANA.

VEHICLE BUMPER.

Application filed October 24, 1924. Serial No. 745,607.

*To all whom it may concern:*

Be it known that we, NICK CHMELL, residing at Chicago, in the county of Cook and State of Illinois, and LOUIS PELIS and JOHN DMYTRASH, both residing at Laporte, in the county of Laporte and State of Indiana, all citizens of Ukraine, have invented certain new and useful Improvements in Vehicle Bumpers, of which the following is a specification.

This invention relates to bumpers for the use in connection with automobiles, trolley car and other vehicles, and its main object is the provision of a bumper adapted to grasp a person's body, elevate it above the ground and prevent it from falling under the wheels of the vehicle during an accident and thus to prevent a serious injury.

With the above general object in view and others that will appear as the nature of the invention is better understood, the same consists of the novel construction, combination and arrangement of parts hereinafter more fully described, illustrated in the accompanying drawings and pointed out in the appended claims.

In the drawings forming a part of this application, and in which like designating characters refer to corresponding parts throughout the several views, Figure 1 is a top plan view of the bumper in an inoperative or set position, with a fragmentary top plan view of the front part of the vehicle to which the bumper is attached;

Figure 1:
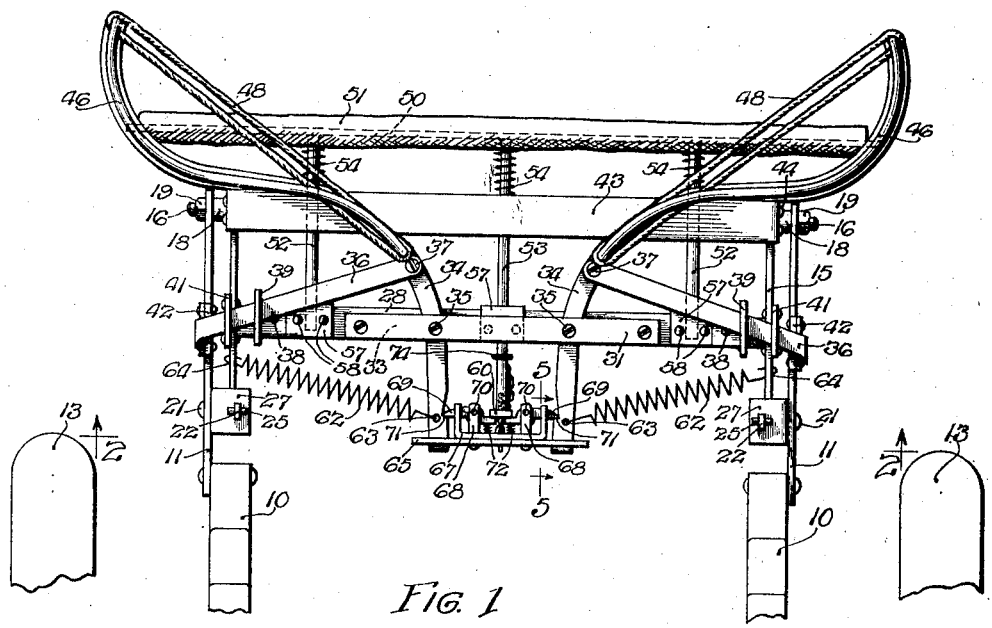
Figure 3:
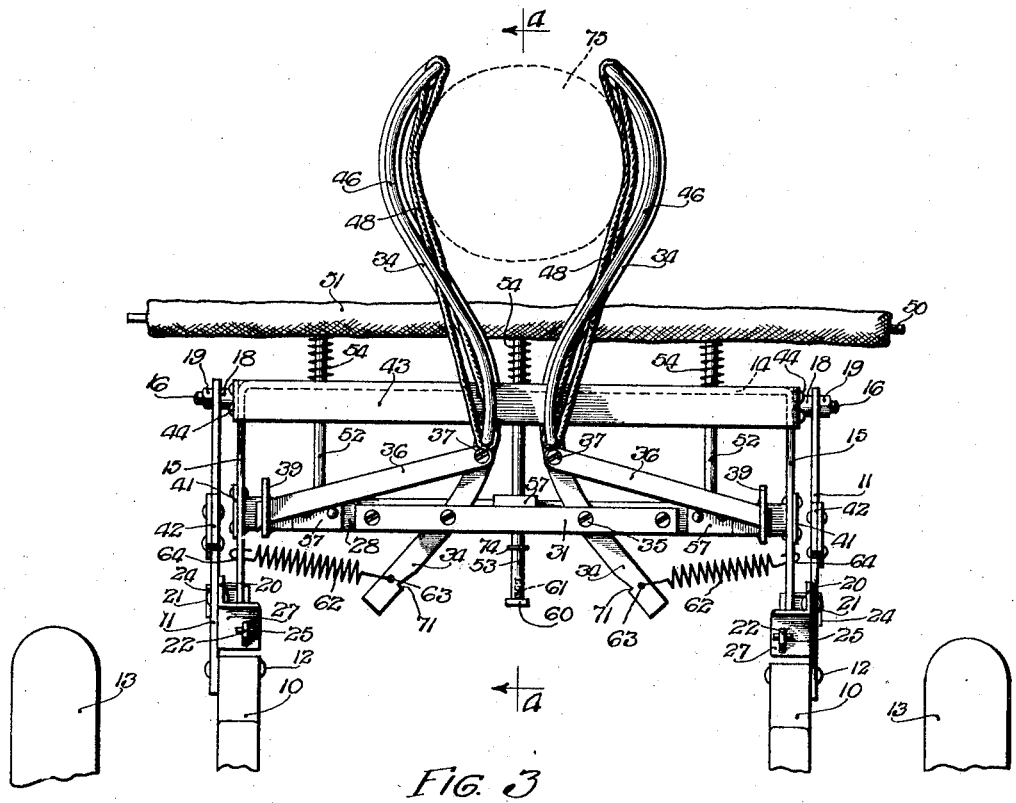
Figure 3 is a top plan view showing the operative position of the bumper, with a fragmentary top plan view of the front part of the vehicle.

As shown on Figs. 1 and 3 the bumper is mounted on the front springs 10 of a vehicle and attached thereto by means of the side bars 11, said side bars being riveted by the shackle bolts 12, the front wheels of the vehicle being marked by 13. The side bars 11 remain always in a horizontal and stationary position in respect to the body of the vehicle.

The device embodies a three sided frame consisting of a front plate 14 and two side plates 15, the front plate 14 being positioned transversely of the side bars 11, the side plates 15 assuming a parallel relation with the side bars 11. The complete frame is positioned within the two side bars 11 as shown on Figs. 1 and 3. Rearwardly of the plate 14 the forward end of the frame is pivoted to the forward ends of the side bars 11 by means of bolts 16. The bolt heads 17, washers 18 interposed between the side bars 11 and side plates 15, and nuts 19 prevent the horizontal shifting of the frame in respect to the side bars 11.

Upright plates 20 are pivoted at their lower ends to the rear ends of side bars 11 by means of bolts 21. The upper ends of the plates 20 are bent inwardly at right angles forming flanges 27 in which rectangular slots are formed permitting insertion therein of guiding bars 22 which are firmly secured by means of rivets 23 to the rear ends of side plates 15. The lower ends of said guiding bars are bent outwardly at right angles forming flanges 24 which limit the upright movement of the rear ends of side plates 15 during the process of setting the device to its inoperative position hereinafter described. Pins 25 limit the downward movement of the guiding bars 22 during the operation of the device. Coil springs 26 mounted upon the guiding bars 22 are interposed between the upper edges of the side plates 15 and the flanges 27 of the guiding bars 22. Said coil springs 26 being compressed during the inoperative or set position of the device tend to press upon the rear ends of the plates 15.

Brace 28 connects the two side plates 15 and is permanently fixed thereto at its two downwardly diverging ends 29 by rivets 30. Plate 31 is fixed to the upper surface of the brace 28, and by interposition of washers 32 a longitudinal slot 33 is formed between said plate and said brace, wherein S-shaped arms 34 are positioned and pivoted as at 35. The bolts or locking bars 36 are pivoted at their inner ends to said S-shaped arms as at 37.

Secured by rivets 38 to the brace 28 near its both ends are the upright guiding plates 39, each provided with a slot 40 wherein slide the locking bars 36. Similar plates 41 are secured to the side plates 15, which are also provided with slots accommodating said locking bars 36. The two sets of plates remain in alinement and their slots are much longer than the width of the locking bars 36 so as to permit a free sliding movement of said locking bars during the operation of the device or during the process of setting the same into use. Projections or lugs 42 are provided at the upper edges of side bars 11 upon which the locking bars 36 normally rest.

To further strengthen the structure and to provide guiding means for the arms 34 a front brace 43 is secured to the forward ends of the side plates 15 and disposed thereabove, the brace being riveted to the said plates as at 44. A longitudinal slot 45 as plainly seen on Fig. 4 formed between the plate 14 and the brace 43 permits horizontal sliding movement of the arms 34.

Above the forward ends of arms 34 U-shaped brackets 46 are disposed and riveted thereto as at 47. As seen on Fig. 4 the horizontal portions of said brackets 46 are in parallel relation with arms 34 and on their horizontal plane are S-shaped conforming to the shape of said arms, as illustrated on Figs. 1 and 3.

Bands 48 made of canvas, rubber or any other suitable material are stretched upon the upright portions 49 of the U-shaped brackets 46. The purpose of said bands 48 is to assist arms 34 and brackets 46 in holding a person during the operation of the device and also to prevent any injury to the person held which might otherwise ensue by the sudden action of arms 34.

Forwardly of the plate 14 a conventional bumper plate 50 is positioned. To prevent injury to a person hit thereby said bumper plate is covered by a cushion or padding 51.

On the rear face of said bumper plate three guiding rods are provided which are integrally formed with the bumper plate; the two end rods being marked by 52 and the third, a central rod, indicated by 53. The bumper plate 50 is under tension exerted thereupon by coil springs 54 which are set on each rod and remain interposed between the plate 14 and the bumper plate. Adjacent the rear face of the plate 14 pins 55 are provided upon each rod 52 and rod 53 for the purpose of limiting the forward movement of the bumper plate 50. Each of the rods passes through its respective aperture 56 provided in the plate 14. For further guiding the movement of said rods three lugs 57 are fixed to the brace 28 by rivets 58 and form right angles with said brace. The rearward ends of the rods 52 and 53 pass through the apertures 59 made in the lugs 57.

The central rod 53 is relatively longer than the other two rods and at its rear end is provided with a plunger head 60 which is affixed to the rod by means of its threaded portion 61.

Coil springs 62 are attached to the rear ends of the arms 34 as at 63 and to the side plates 15 as at 64. During the operative condition of the device said coil springs remain compressed as indicated on Fig. 3.

Figure 2:
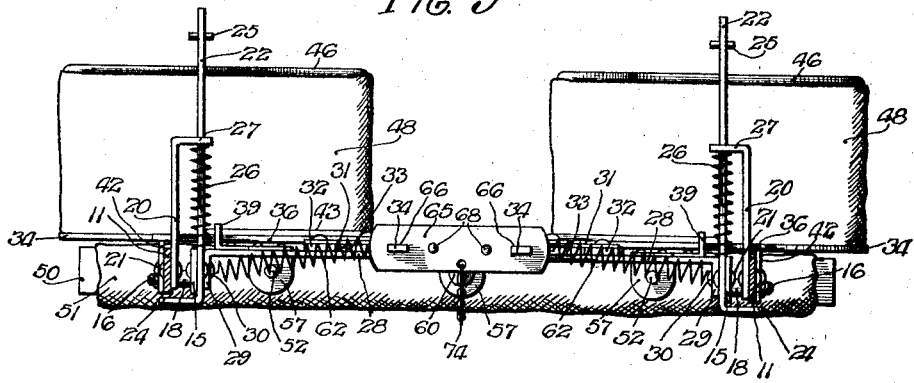
Figure 2 is a rear elevational view with attaching bars shown in section taken on line 2—2 of Figure 1.

In an inoperative or set position of the device as illustrated in Figs. 1 and 2, the forward ends of arms 34 will remain spread apart, and the locking bars 36 will remain in locking engagement with the side bars 11 and side plates 15.

Figure 5:
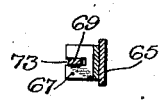
Figure 5 is a side sectional view of a portion of the device taken on line 5—5 of Figure 1.

Counteracting the action of the springs 62 upon arms 34 during the inoperative or set position of the device a yoke is positioned upon the rear ends of arms 34 as plainly seen on Figs. 1 and 2, said yoke consisting of plate 65 which is provided with apertures 66 (Fig. 2) into which fit the ends of arms 34. On the front face of plate 65 a U-shaped bracket 67 is positioned and attached thereto by means of bolts 68. Levers 69 are pivoted to the forward ends of said bolts, the pivot points being marked by 70. The outer ends of the levers 69 rest upon shoulders 71 made in the adjacent edges of the rear ends of the arms 34 and thus prevent creeping movements of the yoke upon the rear ends of said arms. Springs 72 positioned between the U-shaped plate 67 and the inner ends of levers 69 tend to hold the levers in engagement with the arms 34, as plainly seen on Fig. 1. The end portions of said U-shaped plate 67 are provided with recesses 73 wherein move the outer ends of levers 69 and wherein they are held against any lateral displacement as shown on Fig. 5.

Figure 4:
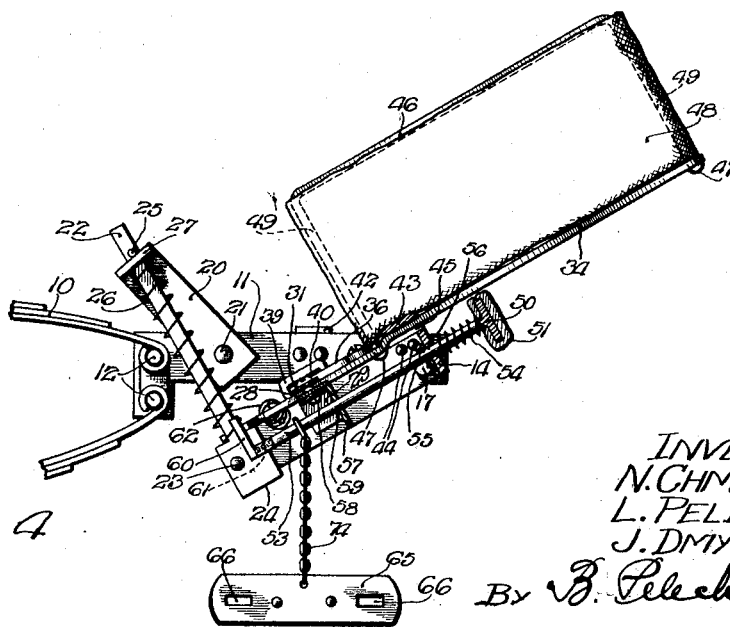
Figure 4 is a side sectional view of the bumper in its operative position taken on line 4—4 of Figure 3.

A chain 74 fixed by one end to the central rod 53 and by the other end to the yoke prevents the latter from dropping to the ground when it is disengaged from arms 34 during the operative position of the device shown on Fig. 4.

Assuming that the device remains in an inoperative or set position as illustrated on Figs. 1 and 2, the bumper plate 50 by hitting a person during an accident will be pressed rearwardly by the impact causing the central rod 53 to slide rearwardly and the rod by its plunger head 60 coming in contact with the inner ends of levers 69 will cause the disengagement of the outer ends of the said levers from the shoulders 71. By continuing action of the plunger head 69 a thrust will be imparted to the yoke causing the plate 65 to disengage from the rear ends of the arms 34, the disengaged yoke becoming suspended upon the chain 74 as illustrated in Fig. 4. Now by the action of springs 62 the rear ends of arms 34 will spread apart causing the forward ends to close. As seen on Fig. 3 the forward ends of the arms will grasp a person remaining in the path of movement of the forward ends of said arms, the person's body being represented by 75. Bands 48 being made of a flexible material will tend to prevent injury to a person during the operation of the arms.

Simultaneously with the hereinabove described operation of the arms 34, locking bars 36 will move inwardly with the arms and will become disengaged from the lugs 42 on side bars 11. The side plates 15 held by the locking bars 36 in engagement with side bars 11 will become released and by the expansion of springs 26 will make a downward swinging movement on their pivot points 16 assuming the position shown on Fig. 4. The forward ends of the arms 34 grasping a person therebetween will become elevated as a result of the action of the expanding springs 26 as plainly seen on Fig. 4. Thus a person held in the arms 34 will be raised from the ground preventing his falling under the wheels of the vehicle.

At the operative condition of the device, illustrated on Figs. 3 and 4, plates 20 will assume an inclined position in respect to the side bars 11 owing to the rearward tilting of the upper ends of the guiding bars 22. Since the guiding bars 22 remain in a stationary relation in respect to the side plates 15, they being rigidly secured thereto, pins 25 bearing upon flanges 27 will not only limit the downward movement of the guiding bars 22, but will also limit the downward movement of the side plates 15 and brace 28 and in consequence the upward movement of the front ends of arms 34.

To adapt the device to an inoperative or set position illustrated on Fig. 1 from that shown on Fig. 4 pressure is exerted upon the forward ends of arms 34 causing the compression of springs 26. During that operation flanges 24 limit the upward movement of side plates 15. Thereupon by spreading the forward ends of arms 34 the locking bars 36 will assume the position shown on Fig. 1. By placing the yoke upon the rear ends of arms 34 the device will become reconditioned for repeated use.

It is observed that the operation of the mechanism causing the vertical movement of the forward ends of arms 34 takes place nearly simultaneously with the operation of the mechanism causing the horizontal closing movement of the forward ends of the said arms, or immediately upon disengagement of the locking bars 36 from lugs 42 on side bars 11 when said locking bars are drawn inwardly by the arms. Obviously the operation of the first mentioned mechanism may be delayed until the forward ends of arms 34 have covered considerable distance in their horizontal closing movement or until they have come to the point of grasping a person's body, and this result may readily be accomplished by merely making the locking bars 36 proportionately longer.

While there is described herein a preferred embodiment of the present invention, it is nevertheless understood that minor changes may be made therein without departing from the spirit and scope of the invention as claimed.

What we claim as new is:

1. In a bumper having side bars whereby it is attached to the body of a vehicle, a frame mounted upon said side bars, arms upon said frame, a bumper plate, locking bars upon said arms holding said frame in an inoperative locked engagement with said side bars, said locking bars moving with said arms, a yoke upon said arms holding the arms in an inoperative open position, means connected to said bumper plate capable of disengaging said yoke from said arms, and springs associated with said side bars and said frame causing elevation of said arms upon movement of said locking bars on operation of said means.

2. In a bumper having side bars whereby it is attached to the body of a vehicle, a frame mounted upon said side bars, arms upon said frame, a bumper plate, locking bars carried by said arms holding said frame in engagement with said side bars, said locking bars being adapted to move with said arms, a yoke engaging said arms, a rod carried by said bumper plate and disposed adjacent to said yoke, said rod being capable of disengaging said yoke from said arms on actuation of said bumper plate, means cooperating with said arms and said frame for imparting horizontal closing movement to the arms and for releasing the engagement of said frame with said side bars, and means cooperating with said frame and said side bars for imparting vertical movement to said arms, both of said means being capable of simultaneous operation upon disengagement of said yoke from said arms on operation of said rod.

3. In a bumper having side bars whereby it is attached to the body of a vehicle, a frame mounted upon said side bars, arms upon said frame, a bumper plate, a yoke in engagement with said arms holding the same in an inoperative open position, means cooperating with said bumper plate and said yoke for releasing the engagement of the latter from said arms, and independent means for closing and for elevating said arms on operation of the first named means.

4. In a bumper having side bars whereby it is attached to the body of a vehicle, a frame mounted upon said side bars, arms upon said frame, a bumper plate, means for holding said arms in an inoperative open position, said means being capable of disengagement on actuation of said bumper plate, means associated with said arms for holding said frame in engagement with said side bars, said last named means being capable of disengagement on operation of the first named means, and means cooperating with said side bars and said frame for elevating said arms on operation of the first and second named means.

5. In a bumper having side bars whereby it is attached to the body of a vehicle, a frame, mounted upon said side bars, arms upon said frame, a bumper plate, a yoke holding said arms in an inoperative open position, said yoke being capable of disengagement from said arms on actuation of said bumper plate, means associated with said arms for holding said frame in engagement with said side bars, said means being capable of disengagement on operation of said yoke, and means cooperating with said side bars and said frame for elevating said arms on operation of said yoke and said first named means.

6. In a bumper having side bars whereby it is attached to the body of a vehicle, a frame mounted upon said side bars, arms upon said frame, a bumper plate, means for holding said arms in an inoperative open position, said means being capable of disengagement on actuation of said bumper plate, locking bars associated with said arms for holding said frame in engagement with said side bars, said locking bars being capable of disengagement on operation of said means, and means cooperating with said side bars and said frame for elevating said arms on operation of said first named means and said locking bars.

7. In a bumper having side bars whereby it is attached to the body of a vehicle, a frame mounted upon said side bars, arms upon said frame, a bumper plate, means for holding said arms in an inoperative open position, said means being capable of disengagement on actuation of said bumper plate, means associated with said arms for holding said frame in engagement with said side bars, said last mentioned means being capable of disengagement on operation of the first named means, and springs cooperating with said side bars and said frame for elevating said arms on operation of both of said means.

8. In a bumper having side bars whereby it is attached to the body of a vehicle, a frame mounted upon said side bars, arms upon said frame, a bumper plate, a yoke holding said arms in an inoperative open position, said yoke being capable of disengagements from said arms on actuation of said bumper plate, locking bars associated with said arms for holding said frame in engagement with said side bars, said locking bars being capable of disengagement on operation of said yoke, and means cooperating with said side bars and said frame for elevating said arms on operation of said yoke and said locking bars.

9. In a bumper having side bars whereby it is attached to the body of a vehicle, a frame mounted upon said side bars, arms upon said frame, a bumper plate, a yoke holding said arms in an inoperative open position, said yoke being capable of disengagement from said arms on actuation of said bumper plate, means associated with said arms for holding said frame in engagement with said side bars, said means being capable of disengagement on operation of said yoke, and springs associated with said frame and said side bars for elevating said arms on operation of said yoke and said means.

10. In a bumper having side bars whereby it is attached to the body of a vehicle, a frame mounted upon said side bars, arms upon said frame, a bumper plate, means for holding said arms in an inoperative open position, said means being capable of disengagement from said arms on actuation of said bumper plate, locking bars associated with said arms for holding said frame in engagement with said side bars, said locking bars being capable of disengagement on operation of said means, and springs cooperating with said side bars and said frame for elevating said arms on operation of said means and said locking bars.

11. In a bumper having side bars whereby it is attached to the body of a vehicle, a frame mounted upon said side bars, arms upon said frame, a bumper plate, a yoke holding said arms in an inoperative open position, said yoke being capable of disengagement from said arms on actuation of said bumper plate, locking bars associated with said arms for holding said frame in engagement with said side bars, said locking bars being capable of disengagement on operation of said yoke, and springs cooperating with said frame and said side bars for elevating said arms on operation of said yoke and said locking bars.

In testimony whereof we affix our signatures.

NICK CHMELL.
LOUIS PELIS.
JOHN DMYTRASH.